United States Patent [19]

Turetsky

[11] Patent Number: 4,789,472

[45] Date of Patent: Dec. 6, 1988

[54] ADSORPTION APPARATUS

[76] Inventor: Isadore Turetsky, 23940 Welby Way, Conoga Park, Calif. 91307

[21] Appl. No.: 30,972

[22] Filed: Mar. 27, 1987

[51] Int. Cl.4 .............................................. B01D 27/02
[52] U.S. Cl. ..................................... 210/248; 210/282
[58] Field of Search ........................ 210/248, 282, 266

[56] References Cited

U.S. PATENT DOCUMENTS

| 2,630,227 | 3/1953 | Rodwell | 210/282 |
| 3,529,726 | 9/1970 | Keenan | 210/282 |
| 3,750,888 | 8/1973 | Rinaldo | 210/172 |
| 4,115,272 | 9/1978 | Mukhamedyaron et al. | 210/266 |

FOREIGN PATENT DOCUMENTS 2116569 10/1972 Fed. Rep. of Germany .
499885 3/1976 U.S.S.R. .

Primary Examiner—Ivars Cintins

[57] ABSTRACT

An adsorption apparatus for the treatment of liquids is disclosed. The apparatus has a separable adsorbent element disposed in a normally drained, dry housing. An adsorbent medium is contained intermediate foraminous members within a hollow cylinder of the element.

2 Claims, 2 Drawing Sheets

ADSORPTION APPARATUS

FIELD OF THE INVENTION

This invention relates to an adsorption apparatus for liquids in which an adsorbent element is disposed in a nomally drained dry housing. Since the apparatus finds particular utility in the field of water treatment, embodiments adapted for such use are hereinafter described as illustrative of the invention and the advantages thereof, it being understood that my invention is not restricted to such use.

An object of my invention is to provide an adsorbent element which is adapted for use in a normally drained, dry housing. Another object of my invention is to provide simple means for removing and installing an adsorbent element; the element being optionally rechargeable or discardable.

Still another object of my invention is to provide the advantage of pressurized fluid flow between axially opposed inlet and outlet passages of an adsorbent element, and to eliminate some of the disadvantages normally experienced when such an element is used.

Embodiments of my invention capable of accomplishing the foregoing objects and providing the advantages contemplated by them and other advantages are described in the following specification which may be readily understood by reference to the accompanying drawings.

DETAILED DESCRIPTION OF THE DRAWINGS

Figure 1:
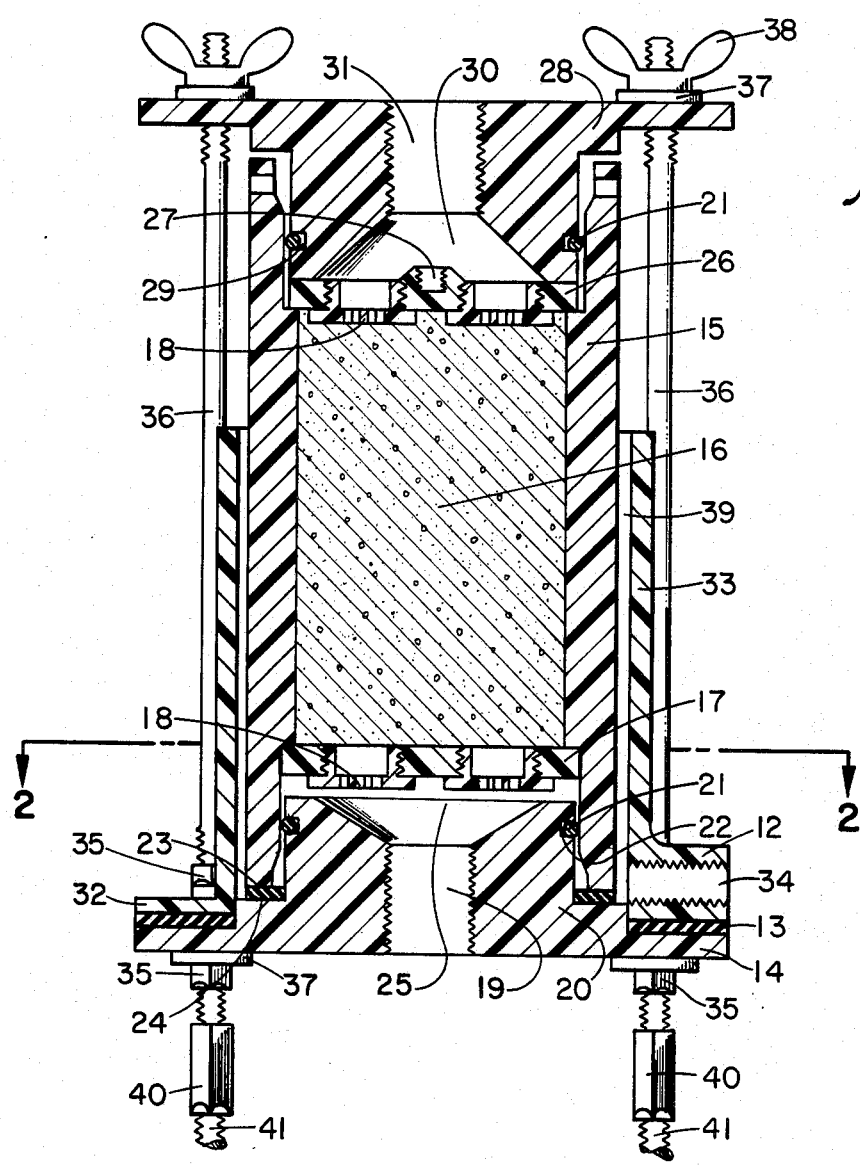
FIG. 1 is a side elevation sectional view of the adsorption apparatus of my invention; the adsorbent element disposed in the normally drained, dry housing.

Referring to FIG. 1 which is for illustrative purposes only, the numeral 15 indicates the hollow cylinder of the adsorbent element, said element containing adsorbent bed 16 which is supported by lower disk 17 having perforated members 18; said disk 17 being preferably but not necessarily bonded to the internal wall and shoulder at the lower end section of hollow cylinder 15. The perforated hollow threaded plugs 18 are disposed in threaded holes of disk 17. Said plugs 18 can have a sliding frictional fit with the walls of said holes, or can be held in position by other mechanical means, so that said plugs can be individually removed and replaced at one's option. The concentric threaded inlet passage 19 is located in the lower separable end member 20; said lower end wall member having an "O" ring seal 21 retained in groove 22, said seal preventing leakage of fluid between the walls of cylinder 15 and said lower end member 20. A ring gasket 23 is disposed intermediate the lower end wall of cylinder 15 and the shoulder 24 of lower end member 20. The use of "O" ring seal 21 and ring gasket 23 provides a double seal at the lower end section of the adsorbent element. Chamber 25 is located intermediate inlet passage 19 and perforated disk 17. The manually separable upper disk 26 has a loose sliding fit within the upper end section of hollow cylinder 15, and rests on the internal shoulder of said upper end section. The upper disk 26 can also have a plurality of perforated plugs 18 which are held in holes of said disk by preferably but not necessarily threaded means. Also located in the center of upper disk 26 is the raised hub having the internally threaded blind hole 27 which can be used to receive a manually inserted threaded eye bolt to facilitate manual removal or placement of said disk 26. The manually separable top wall member 28 has an "O" ring seal 21 retained in groove 29; said "O" ring 21 disposed between said top wall member and the internal wall at the upper end section of cylinder 15. A chamber 30 is located intermediate upper disk 26 and the threaded discharge passage 31 in top wall member 28; said top wall member bearing against upper disk 26 which rests on the upper internal shoulder of hollow cylinder 15. A ring gasket 13 is disposed between the lower end member flange 14 and the flange 32 of housing 33. The threaded drainage passage 34 is located in an enlarged section 12 of housing flange 32 and communicates with annular channel 39 located intermediate the walls of cylinder 15 and housing 33. The assembled apparatus is held together by means of a plurality of tie rods 36 which pass through aligned holes (not shown) located in the flange of each end member, and holes (not shown) in flange 32 of housing 33. A number of nuts 35, screw couplings 40, and associated washers 37 on the lower threaded end sections of tie rods 36 hold the lower end member 20 and housing 33 in relatively fixed position. The wing nuts 38 and their associated washers 37 on the upper threaded end sections of tie rods 36 hold the upper end member in position. Studs 41 joined to their associated screw couplings 40 can be used for joining the assembled adsorption unit to a supporting base.

In operation fluid enters inlet passage 19 to flow through perforations in members 18 of lower disk 17 via chamber 25 which is intermediate said disk 17 and passage 19. Fluid then flows through the adsorbent medium 16 within cylinder 15 to enter chamber 30 via perforations in upper disk 26. The treated fluid then exits through discharge passage 31. Should any leakage of fluid occur across the upper or lower friction seal the leaking fluid will drain through passage 34 by means of annular passage 39. Although the housing is normally drained the passage 34 can be temporarily stoppered with a valve or plug. To remove the adsorbent element the wing nuts 38 and their associated washers are removed, thereby permitting separation of top wall member 28 from cylinder 15. The hollow cylinder 15 can then be lifted from the housing 33 and end member 20 by means of a pin, hook, or other device which can be inserted through holes 42. Residual fluid within the separated element will flow into the housing via perforations in lower disk 17 to be drained by means of drain passage 34. The spent adsorbent medium may then be discarded after removal of upper disk 26. The hollow cylinder 15 can then be cleaned and refilled with new adsorbent, and the upper disk 26 replaced. The adsorbent medium within the cylinder 15 can, at one's option, be flushed to remove fines prior to positioning the element in the housing, or washed in position by means of a valved bypass in the discharge line. It will be obvious to one skilled in the art that use of the normally drained housing permits a tidy removal of the adsorbent element with piping to the lower end wall remaining intact. This feature is particularly desireable when the fluid is corrosive. While the housing 33 can have an increased length so as to cover hollow cylinder 15 entirely, the shorter housing enables one to easily determine at which end a frictional seal may be leaking, as the upper end section is exposed for inspection. The normally drained housing would be an advantage should a leak of corrosive fluid occur, as the fluid can easily be drained into a collecting vessel. It should also be noted that the piping to the apparatus can be arranged so that fluid flow through the adsorbent element can be reversed. In addition, the perforated threaded plugs 18 can be inverted within their associated disks.

Figure 2:
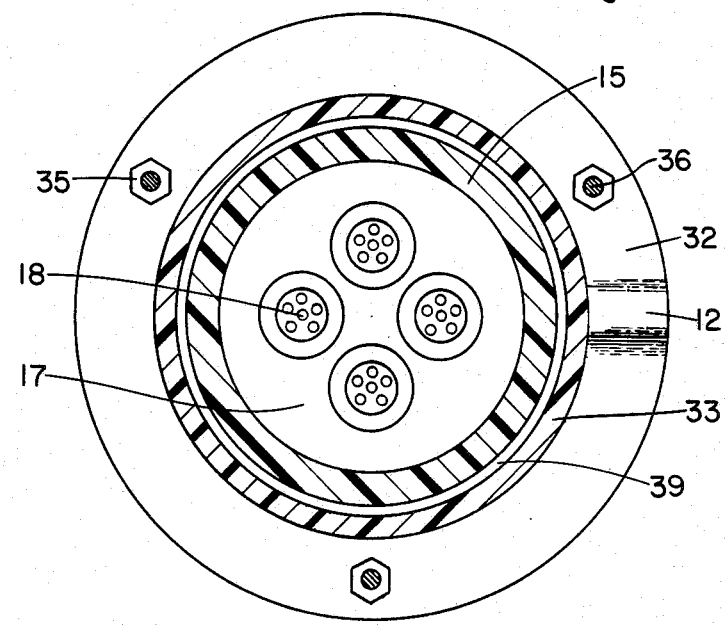
FIG. 2 is a transverse sectional view taken along line 2—2 of FIG. 1.

FIG. 2 is a sectional view taken along line 2—2 of FIG. 1 and shows tie rods 36, nuts 35, and raised section 12 of housing flange 32. Also shown is wall of housing 33, annular channel 39, hollow cylinder wall 15, lower disk 17, and perforated members 18.

Figure 3:
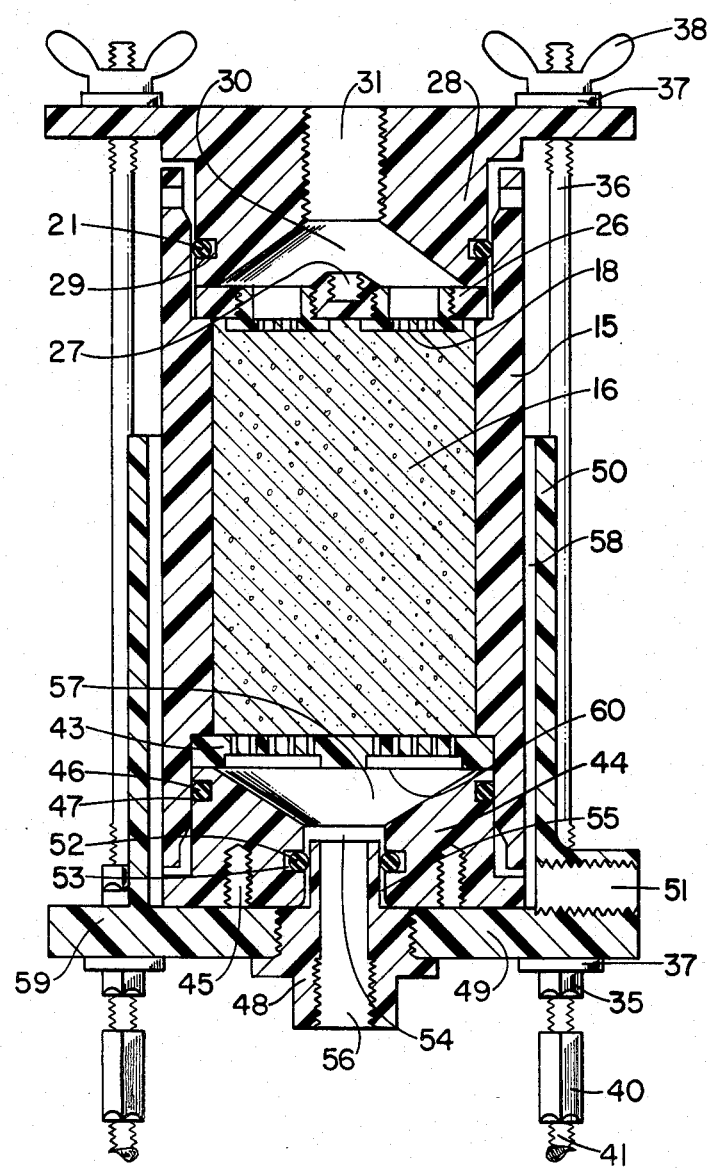
FIG. 3 is generally similar to FIG. 1 but shows a housing and a self-contained adsorbent element, each having an individual bottom end wall.

FIG. 3 is generally similar to FIG. 1 and shows a housing 50 and hollow cylinder 15 of the adsorbent element. The lower disk 43 in cylinder 15 is a singular perforated disk having no separable members; the end wall of the concentric recesses 60 being perforated. Lower end member 44 has a preferably friction fit with the internal wall of the cylinder lower end section, thereby retaining disk 43 which can have a loose fit within said cylinder. The threaded blind holes 45 can be used to receive threaded bolts to facilitate removal of said end member 44. The "O" ring seal 46 retained in groove 47 prevents leakage of fluid between the mating walls of cylinder 15 and lower end member 44. A hollow adapter 48 is screwed into the threaded concentric hole through the bottom wall 49 of housing 50, said housing being drained by means of passage 51 which communicates with annular channel 58. The "O" ring 52 retained in groove 53 encircles the adsorbent element inlet passage 54 in lower end member 44 of said element; said "O" ring 52 also encircles tubular projection 55 of adapter 48 when the adsorbent element is positioned for assembly, thereby preventing fluid leakage between the adjacent walls of said projection 55 and inlet passage 54. The passage 56 in adapter 48 communicates with perforations in disk 43 by means of chamber 57 which also communicates with inlet passage 54. The housing 50 is held in position by means of tie rods 36 and their associated nuts 35, washers 37, screw couplings 40, and studs 41; the lower threaded tie rod end sections passing through their associated holes (not shown) in housing flange 59, and inserted in their respective screw couplings. The studs 41 joined to screw couplings 40 can be used to fix the housing to a supporting base. The top wall member 28, and upper disk 26 are similar to the top wall member 28 and upper disk shown in FIG. 1.

It will be evident to one skilled in the art that the skirt of top wall member 28 can be lengthened and recessed internally, and that upper disk 26 modified to be held within said recess by frictional means thereby obviating the need for the upper internal shoulder within hollow cylinder 15.

The term "drained, dry housing" used in this specification is to be interpreted as a housing into which fluid does not enter during normal operation of the adsorption unit through which pressurized fluid flows. It will be evident that after draining some fluid may remain within the housing.

The use of a considerably smaller adsorption apparatus is contemplated, in which the dry housing is preferably straight threaded (internally or externally) at each end, so as to secure top and bottom adsorbent element end members by threaded means; such as a straight threaded bushing, cap, or other mechanical means. In addition, the optional use of at least one filter member within the adsorbent element is also contemplated.

While those embodiments of this invention hereinbefore illustrated and described are fully capable of performing the objects and accomplishing the advantages primarily stated it will be understood that this invention is not restricted to the specific embodiments hereinbefore set forth, but includes all modifications coming within the scope of the claims that follow.

I claim:

1. An adsorption apparatus for treating liquids, said apparatus comprising: an adsorbent element having inlet and outlet means for flow of fluid therethrough, said element including a hollow cylinder, adsorbent medium disposed intermediate foraminous members within said hollow cylinder, separable top and bottom end wall members disposed in the upper and lower end sections respectively, of said element, a passage through each of said wall members; a normally drained, dry housing which is lesser in height than said element, and having a drain passage, a bottom wall member, and a passage through said housing bottom wall members; said element disposed in said housing, and means to keep sidewalls of said element and said housing in fixed spaced relationship.

2. The invention defined in claim 1 in which a section of said housing bottom wall member is the bottom wall member of said element.

* * * * *